(12) United States Patent
Kakui

(10) Patent No.: US 7,344,076 B2
(45) Date of Patent: Mar. 18, 2008

(54) LASER PROCESSING DEVICE

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 216 days.

(21) Appl. No.: 11/363,288

(22) Filed: Feb. 28, 2006

(65) Prior Publication Data
US 2006/0204869 A1    Sep. 14, 2006

(30) Foreign Application Priority Data
Feb. 28, 2005  (JP) ............................ P2005-054358

(51) Int. Cl.
*G06K 7/10* (2006.01)
(52) U.S. Cl. ................. 235/454; 235/436; 235/439; 235/491
(58) Field of Classification Search ............... 235/455, 235/491, 436, 439
See application file for complete search history.

(56) References Cited

U.S. PATENT DOCUMENTS 6,808,117 B2 * 10/2004 Han et al. .................... 235/494
7,255,275 B2 *  8/2007 Gurevich et al. ........... 235/455

FOREIGN PATENT DOCUMENTS

JP         2004-322146 A      11/2004

OTHER PUBLICATIONS

Yousuke Kawhito, et al., "In-Process monitoring and adaptive control in laser micro-spot lap welding of aluminum alloy," Proceedings of the 62nd Laser Materials Processing Conference, Dec. 2004, pp. 136-142.

* cited by examiner

*Primary Examiner*—Seung Ho Lee
(74) *Attorney, Agent, or Firm*—McDermott Will & Emery LLP

(57) ABSTRACT

There is disclosed a laser processing device, comprising: a laser light source for emitting laser light; an irradiating optical system for irradiating laser light emitted from the laser light source substantially perpendicularly onto a processing surface of an object to be processed; a reflected light monitoring unit for monitoring the intensity of light reflected from the processing surface which is being irradiated with the laser light from the irradiating optical system; a thermal radiation monitoring unit for monitoring the intensity of thermal radiation generated at the processing surface which is being irradiated with the laser light from the irradiating optical system; and a controller for controlling output of laser light from the laser light source, wherein the controller determines abnormality and either one of reduces and stops output of laser light from the laser light source when the intensity of reflected light monitored by the reflected light monitoring unit drops below a first prescribed value during irradiation by the laser and the output of laser light from the laser light source is in a prescribed state and either one of prior to the start and after the end of thermal radiation.

8 Claims, 3 Drawing Sheets

*Fig.3*

| THERMAL RADIATION REFLECTED LIGHT | $Ph \geq B$ | $Ph < B$ |
|---|---|---|
| $Pr < A$ | NORMAL OPERATION (NORMAL FEEDBACK CONTROL) | ERROR OPERATION (LASER OUTPUT REDUCED, ALARM GENERATED ETC.) |
| $Pr \geq A$ | FAULTY OPERATION (ALARM GENERATED ETC.) | NORMAL OPERATION (NORMAL FEEDBACK CONTROL) |

LASER PROCESSING DEVICE

BACKGROUND OF THE INVENTION

1. Field of the Invention

The present invention relates to a device which irradiates laser light output from a laser light source onto a processing object to perform a process on the processing object.

2. Related Background Art

Laser processing devices comprise a laser light source which outputs laser light, and an irradiating optical system which irradiates laser light output from the laser light source onto a processing surface of a processing object (for example, see Japanese Patent Application Laid-Open No. 2004-322146 and Kawato, Yousuke et al., "In-process Monitoring and Adaptive Control when Performing Laser Microspot Lap Welding of Aluminum Alloys", 62$^{nd}$ Japan Laser Processing Society Paper Compilation, Pages 136-142, Dec. 2004).

SUMMARY OF THE INVENTION

However, conventional laser processing devices do not take into consideration the possibility of a person's body being irradiated by the laser light or the risk of causing a fire because of the introduction of unexpected flammable materials such as dust. With the foregoing in view, an object of the present invention is to provide a laser processing device which can more safely perform laser processing.

The laser processing device of the present invention is comprising a laser light source for emitting laser light; an irradiating optical system for irradiating laser light emitted from the laser light source substantially perpendicularly onto a processing surface of an object to be processed; a reflected light monitoring unit for monitoring the intensity of light reflected from the processing surface which is being irradiated with the laser light from the irradiating optical system; a thermal radiation monitoring unit for monitoring the intensity of thermal radiation generated at the processing surface which is being irradiated with the laser light from the irradiating optical system; and a controller for controlling output of laser light from the laser light source, wherein the controller determines abnormality and either one of reduces and stops output of laser light from the laser light source when the intensity of reflected light monitored by the reflected light monitoring unit drops below a first prescribed value during irradiation by the laser and the output of laser light from the laser light source is in a prescribed state and either one of prior to the start and after the end of thermal radiation.

The laser processing method of the present invention for processing a surface of an object by irradiating laser light substantially perpendicularly onto the surface, comprising the steps of: monitoring the intensity of light reflected from the surface which is irradiated with the laser light; monitoring the intensity of thermal radiation generated at the surface which is irradiated with the laser light; and either one of reducing and stopping the output of laser light when the intensity of monitored reflected light drops below a first prescribed value during irradiation by the laser and the output of laser light is in a prescribed state and either one of prior to the start and after the end of thermal radiation.

The present invention will be more fully understood from the detailed description given hereinbelow and the accompanying drawings, which are given by way of illustration only and are not to be considered as limiting the present invention.

Further scope of the applicability of the present invention will become apparent from the detailed description given hereinafter. However, it should be understood that the detailed description and specific examples, while indicating the preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a Karnaugh map for another example of the laser processing device 1 of the present embodiment.

DESCRIPTION OF THE PREFERRED EMBODIMENTS

The best mode for carrying out the invention will be described below in detail while referring to the attached drawings. Incidentally, identical elements have been assigned identical codes in the descriptions of the drawings, and a duplicate description has been omitted.

Figure 1:
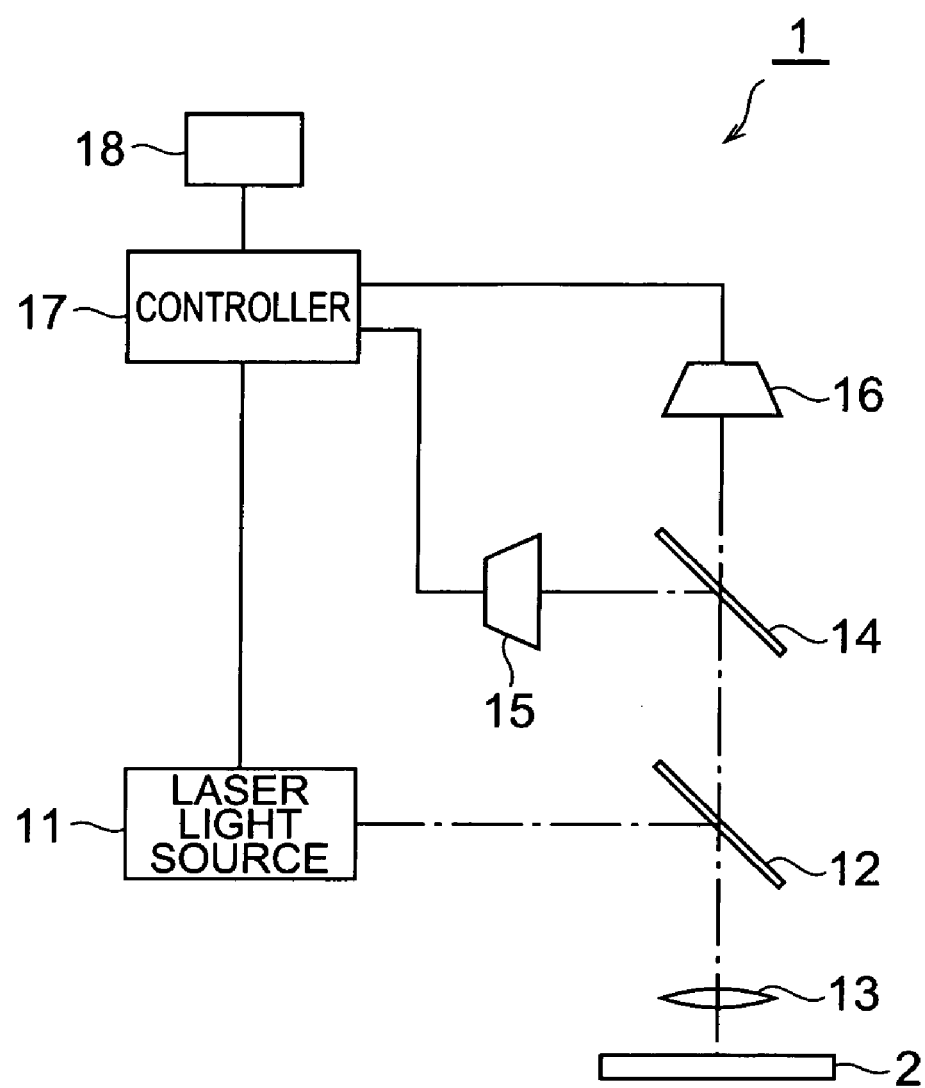
FIG. 1 is a block diagram of the laser processing device 1 of the present embodiment.

FIG. 1 is a block diagram of the laser processing device 1 of the present embodiment. The laser processing device 1 shown in this figure is a device for irradiating laser light onto a processing object 2 in order to process the processing object 2, and comprises a laser light source 11, a beam splitter 12, a light collecting lens 13, a dichroic mirror 14, a reflected light monitoring unit 15, a thermal radiation monitoring unit 16, and a controller 17.

Incidentally, the laser light source 11 outputs laser light to be irradiated onto the processing object 2. The laser light output from the laser light source 11 may be a continuous beam or a pulse beam. Furthermore, the wavelength of the laser light output from the laser light source 11 is appropriately selected based on the material (such as metal or plastic) of the processing object 2, and is for instance in the 1 µm wavelength band. Incidentally, compared to laser light in the 10.6 µm wavelength band which is output from a carbon dioxide laser light source, laser light in the 1 µm wavelength band has a lower diffraction spread so collecting light into a narrow region is easier. For instance, the laser light source 11 includes a Nd doped YAG rod and a Yb doped fiber as laser media, and a laser diode as the pumping light source which outputs pumping light that excites the active element (such as Nd, or Yb) doped into the laser medium.

The beam splitter 12 and the light collecting lens 13 compose the irradiating optical system which substantially perpendicularly irradiates the laser light output from the laser light source 11 onto the processing surface of the processing object 2. The beam splitter 12 has a reflectivity of 99% and transmissivity of 1%, so nearly all of the incident light is reflected while the remaining part is transmitted. The light collecting lens 13 is established between the beam splitter 12 and the processing object 2.

The beam splitter 12 receives the laser light output from the laser light source 11, and reflects most of the laser light to the light collecting lens 13. The light collecting lens 13 receives the portion of the laser light output from the laser light source 11 which was reflected from the beam splitter 12, and collects that laser light onto the processing surface of the processing object 2. Means for adjusting the relative positional relationship between the irradiating optical system and the processing object 2 (such as a table for placing the processing object 2) is preferably established so that the laser light from the light collecting lens 13 will be perpendicularly incident upon the processing surface of the processing object 2.

Furthermore, the light collecting lens 13 receives reflected light and thermal radiation generated at the processing surface of the processing object 2 which is irradiated by laser light, and outputs this reflected light and thermal radiation to the beam splitter 12. The beam splitter 12 receives the reflected light and thermal radiation output from the light collecting lens 13, transmits a portion of the reflected light and thermal radiation, which is output to the dichroic mirror 14. The reflected light has the same wavelength as the laser light output from the laser light source 11. Furthermore, the thermal radiation is generated when the processing object 2 is melted by the laser light irradiation to form plasma, and includes wavelength components which are different from the wavelength of the laser light (such as visible light and light in the 1.3 μm wavelength band for near infrared light.)

The dichroic mirror 14 receives reflected light and thermal radiation output from the beam splitter 12, and then separates and outputs the reflected light and thermal radiation. For instance, the dichroic mirror 14 reflects reflected light and transmits thermal radiation. The reflected light monitoring unit 15 receives the reflected light which arrives from the dichroic mirror 14 and monitors the intensity of the reflected light. The thermal radiation monitoring unit 16 receives the thermal radiation which arrives from the dichroic mirror 14 and monitors the intensity of the thermal radiation. The controller 17 controls the laser light output from the laser light source 11 based on the intensity of reflected light monitored by the reflected light monitoring unit 15 and the intensity of thermal radiation monitored by the thermal radiation monitoring unit 16. The controller 17 preferably has an abnormality indicator 18 for indicating abnormality when the controller 17 determines abnormality. For instance, the abnormality indicator 18 is an alarm lamp, a sign board, or a warning sound generator.

When laser light is irradiated onto the processing object 2, reflection will occur from the start of irradiation. Processing is completed depending on the processing object and the processing purpose. In this case, if the condition of the detected reflected light is normal and the intensity of the monitored reflected light is below a prescribed value, contamination by an unexpected material will be determined, and the laser light output from the laser light source 11 will be reduced or stopped, or an alarm will be generated.

For processes such as welding and cutting which require longer time, when the processing object 2 begins to melt after laser light irradiation, the reflectivity will drop and thermal radiation will be generated. Therefore, normally, the intensity of reflected light monitored by the reflected light monitoring unit 15 will gradually be reduced and the intensity of thermal radiation monitored by the thermal radiation monitoring unit 16 will gradually increase.

Assuming that a foreign object such as a person's body or a flammable material (for instance dust) or the like is accidentally placed directly in front of the processing object 2 during irradiation by the laser light, a disaster such as fire or burning may be expected to occur. However, the reflected light and the thermal radiation generated when the laser light is irradiated on a foreign object which has been inserted directly in front of the processing object 2 will differ from the reflected light and thermal radiation generated when the laser light is irradiated onto the processing object 2. Therefore, the controller 17 will perform the following controls using this difference.

The simplest control by the controller 17 is as shown below. Laser light is output from the laser light source 11 and the power of the laser light is set to a target value. The laser light output from the laser light source 11 is reflected by the beam splitter 12, converged by the light collecting lens 13, and irradiated as collective light onto the processing surface of the processing object 2. The intensity of the reflected light generated at the processing surface of the processing object 2 irradiated with the laser light is monitored by the reflected light monitoring unit 15, and the intensity of the reflected light Pr determined by monitoring is compared to a prescribed value A by the controller 17. Furthermore, the condition is continued if the controller 17 determines that the reflected light intensity Pr is a prescribed value or more, while in other cases, the laser light output from the laser light source 11 is reduced or stopped, or an alarm is generated. Preferably, further when either one of prior to the start and after the end of thermal radiation, the laser light output from the laser light source 11 is reduced or stopped, or an alarm is generated. For instance, the controller 17 sets the time after a prescribed period from the start of irradiating laser for the time either one of prior to the start and after the end of thermal radiation.

Figure 2:
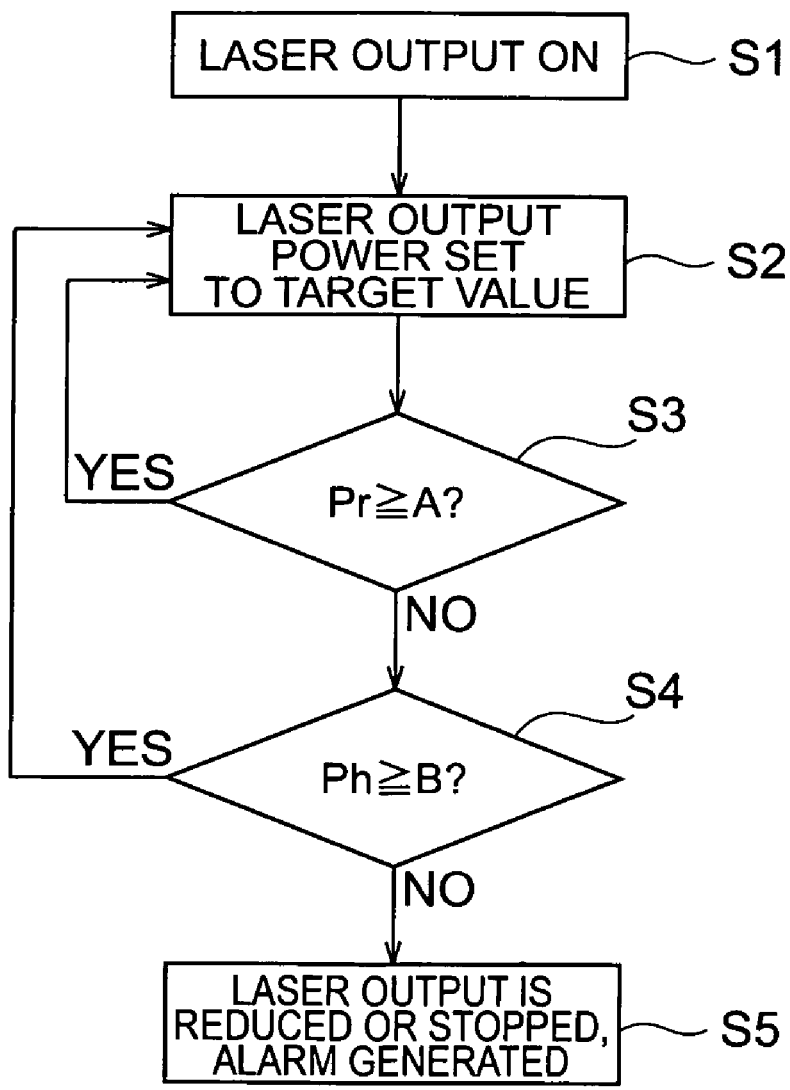
FIG. 2 is a timing chart showing an example of the operation of the laser processing device 1 of the present embodiment.

However, more preferable is for the controller 17 to perform the control shown in FIG. 2 or FIG. 3 using the monitoring results from the thermal radiation monitoring unit 16.

FIG. 2 is a timing chart showing an example of the operation of the laser processing device 1 of the present embodiment. In step S1, laser light is output from the laser light source 11, and then in step S2, the power of the laser light output from the laser light source 11 is set to a target value. In step S2, the power of pumping light which is supplied to the laser medium from the pumping light source within the laser light source 11 may be set to a target value. The laser light output from the laser light source 11 is reflected by the beam splitter 12, converged by the light collecting lens 13, and irradiated as collective light onto the processing surface of the processing object 2.

In step S3, the intensity of the reflected light generated at the processing surface of the processing object 2 which is irradiated with the laser light is monitored by the reflected light monitoring unit 15, and the intensity Pr of the reflected light obtained by monitoring is compared by the controller 17 to a prescribed value A. Furthermore, if the controller 17 determines that the intensity of reflected light Pr is a prescribed value A or more, the process returns to step S2, and otherwise proceeds to step S4.

In step S4, the intensity of the thermal radiation generated at the processing surface of the processing object 2 which is irradiated with the laser light is monitored by the thermal radiation monitoring unit 16, and the thermal radiation intensity Ph obtained by monitoring is compared by the controller 17 to a prescribed value B. Furthermore, if the controller 17 determines that the thermal radiation intensity Ph is a prescribed value B or more, the process returns to step S2, and otherwise proceeds to step S5.

In step S5, the controller 17 reduces or stops the laser light output from the laser light source 11, or generates an alarm.

In this manner, whether or not "Pr<A" and "Ph<B" is determined by the loop of steps S2 and S3 as well as the loop of steps S2 to S4, and if both "Pr<A" and "Ph<B" then the process will continue to step S5, but otherwise ("Pr≧A" or "Ph≧B"), the power of the laser light output from the laser light source will be maintained at the target value.

In other words, if "Pr≧A" or "Ph≧B", the laser light will be determined to be properly irradiating the processing object 2, and the current conditions will be continued. On the other hand, if "Pr<A" and "Ph<B", then it will be determined that the reflected light intensity Pr and the thermal radiation intensity Ph obtained by monitoring are lower respectively because a foreign object such as a person's body or a flammable material are directly in front of the processing object 2, and the controller 17 will reduce or stop the laser light output from the laser light source 11, or will generate an alarm (step S5). Therefore, if a foreign object such as a person's body or a flammable material or the like is placed directly in front of the processing object 2, the laser light output of the laser light source 11 will immediately be reduced or stopped, and therefore laser processing can be performed more safely.

FIG. 3 is a Karnaugh map showing another example of the operation of the laser processing device 1 of the present embodiment. This figure shows the function of the controller 17 in each of 4 conditions, based on whether the reflected light intensity Pr determined by monitoring using the reflected light monitoring unit 15 is larger or smaller than a prescribed value A, and whether the thermal radiation intensity Ph determined by monitoring using the thermal radiation monitoring unit 16 is larger or smaller than a prescribed value B.

As shown in this figure, if "Pr<A" and "Ph≧B", or if "Pr≧A" and "Ph<B", the laser light will be determined to be properly irradiating onto the processing object 2. If "Pr<A" and "Ph<B", then it will be determined that the reflected light intensity Pr and the thermal radiation intensity Ph obtained by monitoring are lower respectively because a foreign object such as a person's body or a flammable material are directly in front of the processing object 2, and the controller 17 will reduce or stop the laser light output from the laser light source 11, or will generate an alarm (step S5). The control for the above 3 cases will be identical to the control for FIG. 2. The case where "Pr≧A" and "Ph≧B" is not normally possible, so in this case, it will be determined that there is a failure in some structural element of the laser processing device 1, so an alarm will be generated, and the laser light output of the laser light source 11 will be reduced or stopped for the sake of safety.

The present invention is not restricted to the above embodiments, and various alternatives are possible. For instance, a polarization extinction ratio monitor combination device may be used in place of the beam splitter 12. Furthermore, the laser light output from the laser light source 11 was spatially transmitted to irradiate onto the processing object 2, but transmission by optical fiber to irradiate onto the processing object is also acceptable, and in this case, a fiber optic coupler is preferably used in place of the beam splitter 12.

As described above, laser processing can be performed more safely by using the present invention.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of following claims.

What is claimed is:

1. A laser processing device, comprising:
a laser light source for emitting laser light;
an irradiating optical system for irradiating laser light emitted from said laser light source substantially perpendicularly onto a processing surface of an object to be processed;
a reflected light monitoring unit for monitoring the intensity of light reflected from the processing surface which is being irradiated with the laser light from said irradiating optical system;
a thermal radiation monitoring unit for monitoring the intensity of thermal radiation generated at the processing surface which is being irradiated with the laser light from said irradiating optical system; and
a controller for controlling output of laser light from said laser light source,
wherein said controller determines abnormality and either one of reduces and stops output of laser light from said laser light source when the intensity of reflected light monitored by said reflected light monitoring unit drops below a first prescribed value during irradiation by the laser and the output of laser light from said laser light source is in a prescribed state and either one of prior to the start and after the end of thermal radiation.

2. The laser processing device according to claim 1, wherein said controller sets either one of the time after a prescribed period from the start of irradiating laser and the time when the intensity of thermal radiation monitored by said thermal radiation monitoring unit is below a second prescribed value for the time either one of prior to the start and after the end of thermal radiation.

3. The laser processing device according to claim 1, wherein said controller has an abnormality indicator for indicating abnormality when said controller determines abnormality.

4. The laser processing device according to claim 1, wherein said controller doesn't either one of reduce and stop the output of laser light from said laser light source when the intensity of reflected light monitored by said reflected light monitoring unit drops below the first prescribed value and the intensity of thermal radiation monitored by said thermal radiation monitoring unit is above a second prescribed value.

5. The laser processing device according to claim 1, wherein said controller has an abnormality indicator and determines abnormality, and the abnormality indicator indicates abnormality when the intensity of reflected light monitored by said reflected light monitoring unit is above the first prescribed value and the intensity of thermal radiation monitored by said thermal radiation monitoring unit is above a second prescribed value.

6. A laser processing method for processing a surface of an object by irradiating laser light substantially perpendicularly onto the surface, comprising the steps of:
monitoring the intensity of light reflected from the surface which is irradiated with the laser light;
monitoring the intensity of thermal radiation generated at the surface which is irradiated with the laser light; and either one of reducing and stopping the output of laser light when the intensity of monitored reflected light drops below a first prescribed value during irradiation by the laser and the output of laser light is in a prescribed state and either one of prior to the start and after the end of thermal radiation.

7. The laser processing method according to claim 6, either one of not reducing and stopping the output of laser light when the intensity of monitored reflected light drops below the first prescribed value and the intensity of monitored thermal radiation is above a second prescribed value.

8. The laser processing method according to claim 6, further comprising a step of determining abnormality when the intensity of monitored reflected light is above the first prescribed value and the intensity of monitored thermal radiation is above a second prescribed value.

* * * * *